Oct. 18, 1927.

W. C. WOLFE

TAMPING TOOL

Re. 16,775

Original Filed March 20, 1925

INVENTOR.
WILLIAM C. WOLFE.

BY

ATTORNEYS.

Reissued Oct. 18, 1927. Re. 16,775

UNITED STATES PATENT OFFICE.

WILLIAM C. WOLFE, OF RICHMOND, INDIANA.

TAMPING TOOL.

Original No. 1,565,697, dated December 15, 1925, Serial No. 17,006, filed March 20, 1925. Application for reissue filed August 1, 1927. Serial No. 209,957.

This invention relates to an improved implement which combines the advantages of a tamping tool or spade with the advantage incident to the use of fluid pressure devices. The invention also relates to an improved method of tamping ballast under railway tie, foundation, etc., by utilizing fluid pressure in a particular manner.

It has been customary heretofore to manually tamp stone, sand or gravel ballast under railway ties, where the ties have been slightly elevated to the proper level by means of the usual tools. This is generally accomplished by manually forcing the material under the tie from side to side and tamping it solidly in place, or by forcing ballast material from an outside source under the ends of the tie by means of air pressure. Accordingly, there is often a space left substantially under the center of the tie which cannot well be reached, and a great deal of time and labor is consumed.

It is the object of this invention to provide a relatively simple and practical means for forcing the material under the tie in compact formation so as to completely fill the voids by air pressure applied directly to the tamping material, and to this end this invention contemplates a suitable tool which may be conveniently handled for the purpose, and which may be readily positioned with respect to the tie and material for permitting the air pressure to act thereon. It has been demonstrated that by means of air pressure the stone, rock or sand or other tamping material will be carried and compacted under the tie much more rapidly and efficiently than heretofore with very little labor.

Another object is to provide an improved implement combining the advantages of a digging or tamping tool with the advantages incident to the use of compressed air.

Another object is to provide a method of tamping ballast under railway ties or other supports, whereby material adjacent the tie or support may be utilized and whereby the ballast may be tamped under the center of the tie as well as under the ends, and whereby the tamping is accomplished with maximum speed and minimum cost and effort.

Other objects will be apparent from the description of the following preferred embodiment of my invention.

The full nature of the invention will be understood from the accompanying drawings and the following description and claims.

Figure 1:
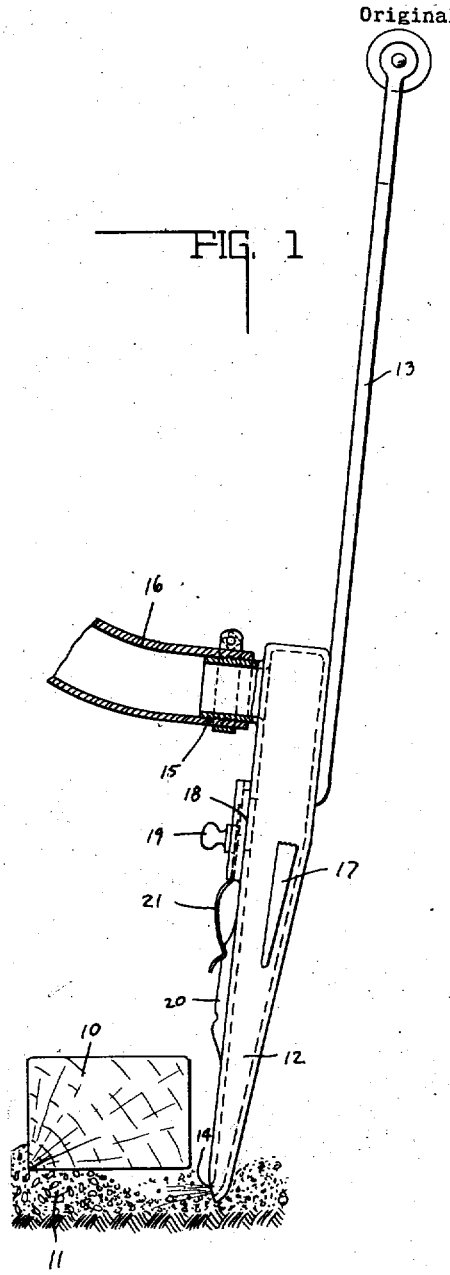
Figure 2:
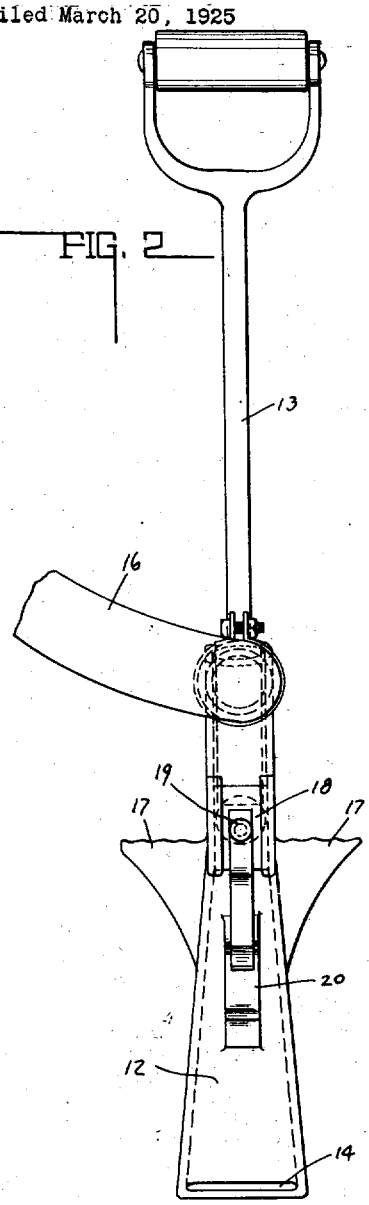

In the drawings, Figure 1 is a side elevation of the tamping tool showing it positioned with respect to the tie. Figure 2 is a front elevation thereof.

In the drawings there is shown a section through a railway tie 10 with ballast 11 being packed thereunder, which comprises stone, gravel, sand, cinders or the like.

The tool consists of a spade-like member 12 to which is rigidly secured a handle 13. Said spade member is flared at the bottom and tapers toward the top in front elevation, as shown in Figure 2, while being reduced to a relatively sharp edge and increasing in thickness toward the top in side elevation, as shown in Figure 1. Said member is hollow and is provided with a horizontal elongated slot 14 extending throughout the entire width thereof adjacent the lower edge, said slot communicating through the hollow portion of the spade member with a tubular extension or fitting 15 positioned adjacent the top thereof and extending forwardly from the front face. A flexible hose or the like 16 is connected with the fitting 15 leading from a suitable source of air pressure.

For this purpose an air compressor or blower of any suitable type may be portably mounted or supported upon a hand car or the like so as to produce a given air pressure which will be forced through the tube 16 and the hollow portion of the spade member so as to be forcibly blown through the slot 14. The air pressure cannot be definitely defined as it will vary with different conditions, but in no case should it be sufficient to blow material out from under the tie.

Rigidly mounted on each side of the spade member there are foot rest projections 17 which are utilized by the operator for forcing the spade-like member into proper tamping position in the usual manner, and an air valve 18 is conveniently positioned on the front face thereof. Said valve may be opened or closed by the operator by grasping a handle 19 and pulling it up into closed position to put the device in operation. Upon forcing the handle 19 downwardly, the valve may be opened and the compressed air or air in motion may, therefore, escape through the valve opening rather than the slot 14 when it is desired that the operation be discontinued. A suitable means is provided for maintaining the valve in open or closed position, which, as herein shown, comprises the notched block 20 secured to the face of the spade member immediately below the valve, upon which a spring 21 is adapted to ride and engage in the notches to maintain the valve in a given position.

In operation the operator forces the spade into proper tamping position principally by means of his foot and weight bearing upon one of the projections 17, thereby forcing the relatively sharp spade edge into the material. The travel of the compressed air, when it is turned on, is caused to pass through the slot 14 in a horizontal direction, as shown in Figure 1. The force of the air engaging the loose material forces it under the tie and firmly packs it, causing the finer particles to fill all the voids between the larger particles.

It should be noted that the air is at relatively low pressure and is not used as an injector, which is objectionable as it tends to blow the fine material out of place and to negative the desired results. The air in this process merely causes the fine material immediately in front of the tool to be thoroughly packed under the tie or support, and the void left by this material is filled in and tamped by the vertical manipulation of the tool.

The spade member may be readily manipulated to continually position the same for forcing fresh material thereunder or under various parts of the tie. It will be observed, therefore, that with very little labor, efficient tamping may be rapidly accomplished.

While the device has been described as pertaining particularly to the tamping of railroad ties, other cross ties and supporting members may be likewise tamped thereby as well as all under fillings of a similar nature. While the tool has been herein described as employing air for this purpose, it may be possible to employ other means such as fluids, liquids or gases in the same manner, without departing from this invention.

The invention claimed is:

1. A tool of the character described, including a spade-like member having a passage therethrough, a flexible hose communicating with said passage for conducting fluid under pressure therein, and a flared bottom to said member having an elongated slot adjacent thereto in communication with said passageway for directing the fluid laterally for engaging said material.

2. A tool of the character described, including a spade-like member having a passage therethrough, a flexible tube secured to said member and communicating with said passage for conducting fluid under pressure thereto, a handle extending upwardly from said spade-like member, and a relatively wide and sharp edge formed at the lower end thereof, said edge being provided with a slot adjacent thereto and communicating with said passageway, said slot opening laterally from the front face of said member for directing the fluid against the material.

3. A tool of the character described, including a spade-like member having a passage therethrough, a flexible hose communicating with said passage for conducting fluid under pressure therein, a flared bottom to said member having an elongated slot adjacent thereto in communication with said passageway for directing the fluid laterally for engaging said material, and laterally extending foot rests provided on each side of said member for permitting the same to be engaged and positioned by foot pressure thereon.

4. A tool of the character described, including a spade-like member having an air passage therethrough, a flexible tube secured to said member and communicating with said passage for conducting fluid under pressure thereto, a handle extending upwardly from said spade-like member, a relatively wide and sharp edge formed at the lower end thereof, said edge being provided with a slot adjacent thereto and communicating with said passageway, said slot opening laterally from the front face of said member for directing the fluid against the material, and laterally extending foot rests provided on each side of said member for permitting the same to be engaged and positioned by foot pressure thereon.

5. A tool of the character described, including a spade-like member having an air passage therethrough, a flexible hose communicating with said passage for conducting fluid under pressure therein, a flared bottom to said member having an elongated slot adjacent thereto in communication with said passageway for directing the fluid laterally, and manually controlled means for controlling the passage of the fluid therethrough.

6. A tool of the character described, including a spade-like member having a passage therethrough, a flexible tube secured to said member and commuicating with said passage for conducting fluid under pressure thereto, a handle extending upwardly from said spade-like member, a relatively wide and sharp edge formed at the lower end thereof, said edge being provided with a slot adjacent thereto and communicating with said passageway, said slot opening laterally from the front face of said member for directing the fluid against the material, and a valve mounted on said tool in position to control an opening communicating with said passage for varying the fluid passage therethrough.

7. A compound implement comprising a spade-like tool provided with an air passage, an air outlet adjacent the bottom of said tool, means for admitting fluid under pressure to said tool, and means for manipulating said tool.

8. A compound implement comprising a spade-like tool, a handle for said tool, a foot rest adjacent said spade-like portion, means including a chamber in the tool and an outlet near the bottom of said tool for supplying compressed air at a point adjacent the bottom of said tool.

9. The method of tamping ballast under supports such as railroad ties, which comprises forcing adjacent material under said supports by fluid pressure, filling the void left by said material with new material, and repeating the cycle till the space under said supports is filled by said material.

10. The method of tamping ballast under a support which comprises forcing the lower end of a tool in the material adjacent to said support, applying fluid pressure through said tool to force the material in front of said tool under said support, filling the void left by said material with new material, and tamping said new material thoroughly in place by means of said tool.

11. The process of ballasting railroad ties which consists in forcing material lying adjacent the sides of the ties to positions beneath the ties by the action of compressed air applied to such material laterally of the space to be filled.

12. The method of tamping ballast under a railroad tie which comprises inserting a tool adjacent the under side of said tie, delivering compressed air from said tool toward the space under the tie whereby adjacent material is blown under the tie, manipulating said tool to blow other material under said tie, and performing the above steps at various points along the perimeter of the tie.

In witness whereof, I hereunto subscribe my name, this 25 day of July, 1927.

WILLIAM C. WOLFE.